UNITED STATES PATENT OFFICE.

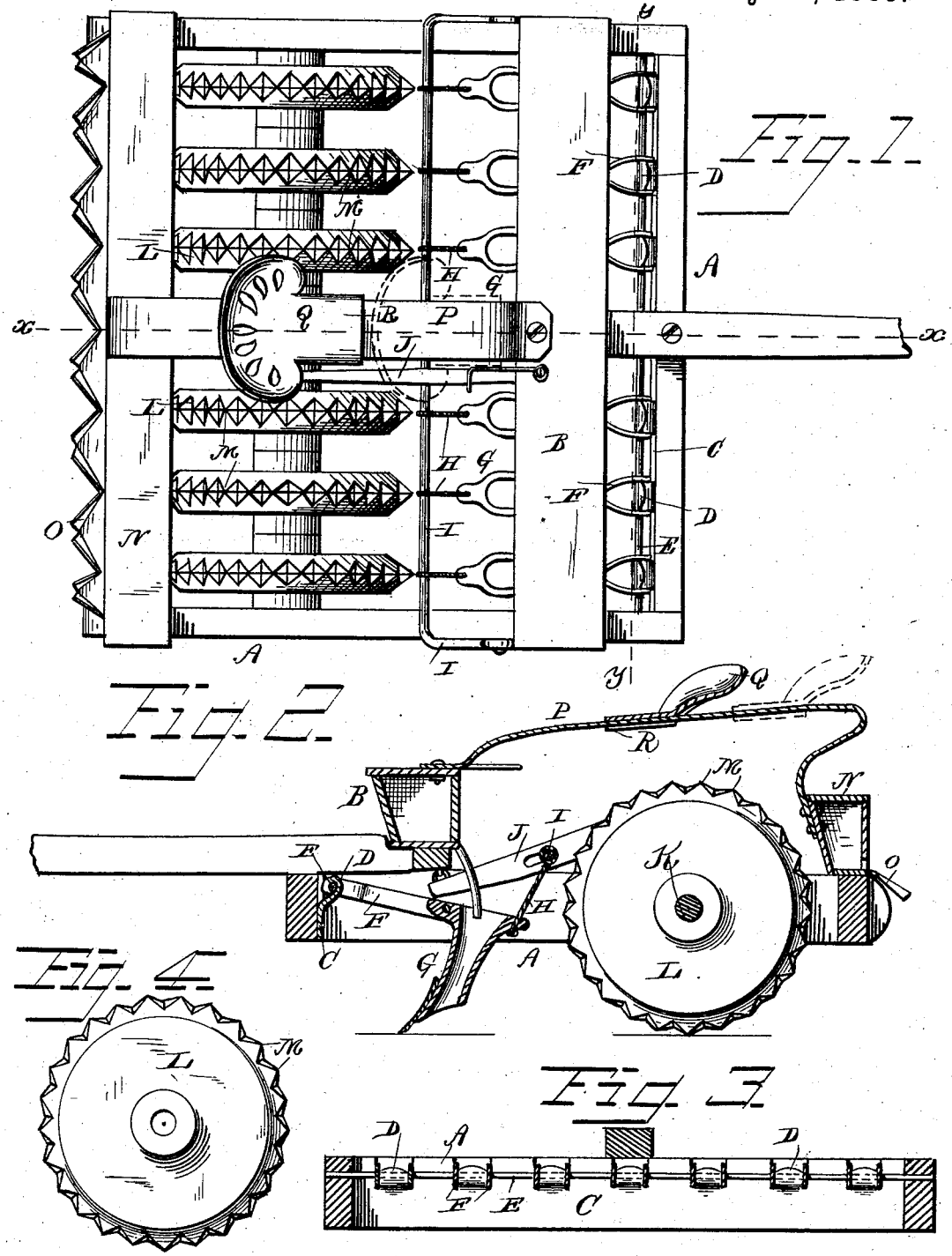

NOAH EVINGER, OF TERRE HAUTE, INDIANA.

SEED-PLANTER.

SPECIFICATION forming part of Letters Patent No. 281,677, dated July 24, 1883.

Application filed December 20, 1882. (No model.)

*To all whom it may concern:*

Be it known that I, NOAH EVINGER, a citizen of the United States, residing at Terre Haute, in the county of Vigo and State of Indiana, have invented a new and useful Seed-Planter, of which the following is a specification, reference being had to the accompanying drawings.

Figure 1 is a plan view. Fig. 2 is a longitudinal vertical sectional view. Fig. 3 is a section on line *x x*, and Fig. 4 is a detail view of one of the wheels or rollers.

Corresponding parts in the several figures are denoted by like letters of reference.

This invention relates to seeding-machines; and it consists more especially in the construction and arrangement of certain wheels or rollers, the objects and advantages of which will be hereinafter fully set forth and specified.

In the drawings hereto annexed, A represents the frame of a seeding-machine embodying my improvements. Said frame supports near its front end a seed-box, B, having seed-dropping mechanism of any suitable construction.

Secured on the rear side of the front piece of frame A is a plate, C, notched and bent at its upper edge, so as to form loops or eyes D, to receive a rod or bar, E, upon which the arms or beams F of the drill-tubes G are hinged, as shown. The front ends of the said beams F are bifurcated, as shown, and fitted on either side of the loops D, by which lateral displacement of the drills is thus prevented. The rear ends of the drill-tubes are connected, by cords or chains H, with a crank-shaft, I, operated by a lever, J, by which the said drill-tubes may be simultaneously lowered or raised out of the ground.

K is a transverse shaft, mounted in the sides of frame A, and carrying a series of wheels or rollers, L, equal in number to the drills, in rear of which they are located. The said rollers, which may be made of wood or iron, or both, have V-shaped edges, which are serrated, as shown, so as to form a circumferential series of pyramidal points, M.

N is a seed-box supported upon the rear end of frame A, and having mechanism of any suitable description for dropping grass, clover, or other similar seed. The seed-dropping tubes O of the seed-box N are located directly in rear of the wheels or rollers L.

P is a longitudinal spring seat-bar mounted upon the seed-boxes B N, which are connected by said bar. The seat Q has a flanged shank, R, by which it is mounted upon the seat-bar P, upon which it may thus be adjusted longitudinally.

The operation of my invention will be readily understood. When the seed-box B is employed for sowing seed in drills, the rollers L, following the drills, serve to crush the clods and to form a furrow, protecting the seed and enabling it to grow more readily. When the seed-box N is used for sowing grass or clover seed in unprepared land, the rollers L, in advance of the seed-box, form recesses or depressions in the ground to receive the seed, which is readily retained in said recesses without danger of being washed away before it has had time to strike root.

The machine is also useful for sowing corn in check-rows or drills by removing a number of the drill-tubes and rollers and adjusting those which are retained at any desired distance apart. The machine is simple in construction, durable, and easily operated.

I claim and desire to secure by Letters Patent of the United States—

1. In a seed-planter and grain-drill, the combination, with the frame A, having plate C, provided with the loops D, of the hinge-rod E and the drill-tube beams F, having bifurcated front ends hinged upon the rod E, straddling the loops D, as set forth.

2. In a seed-planter and grain-drill, the combination, with the hopper and drill-tubes, of the herein-described wheels or rollers L, having V-shaped edges, serrated, so as to form a circumferential series of pyramidal points, as set forth.

3. The combination, with the seed-boxes B N and the drill-tubes, of the intermediate transverse shaft, K, having wheels or rollers L, provided with pyramidal points, as and for the purpose set forth.

In testimony that I claim the foregoing as my own I have hereto affixed my signature in presence of two witnesses.

NOAH EVINGER.

Witnesses:
JOHN B. JOHNSON,
W. B. RHODEN.